P. K. DEDERICK.

Baling-Press.

No. 8,296. Reissued June 25, 1878.

Witnesses

Harry King

William Blackstock

Inventor.

Peter K. Dederick

By L. Hill his Atty.

UNITED STATES PATENT OFFICE.

PETER K. DEDERICK, OF ALBANY, NEW YORK.

IMPROVEMENT IN BALING-PRESSES.

Specification forming part of Letters Patent No. 177,216, dated May 9, 1876; Reissue No. 8,296, dated June 25, 1878; application filed June 13, 1878.

*To all whom it may concern:*

Be it known that I, PETER K. DEDERICK, of Albany, in the county of Albany and State of New York, have invented a new and useful Improvement in Baling-Presses; and I do hereby declare the following to be a full, clear, and exact description of the same, reference being had to the accompanying drawings, forming part of this specification.

My invention relates to improvements upon the continuous-baling presses for which numerous patents have heretofore been granted me; and consists, first, in providing an aperture in the side of the press for the purpose of introducing the partition-followers; secondly, in the frame for facilitating the introduction of the partition-followers; thirdly, in a device for covering the aperture through which the followers are inserted; fourthly, in providing the followers with grooved projections; and, lastly, in the employment of a yielding material between the leaves of the traverser.

Figure 1:
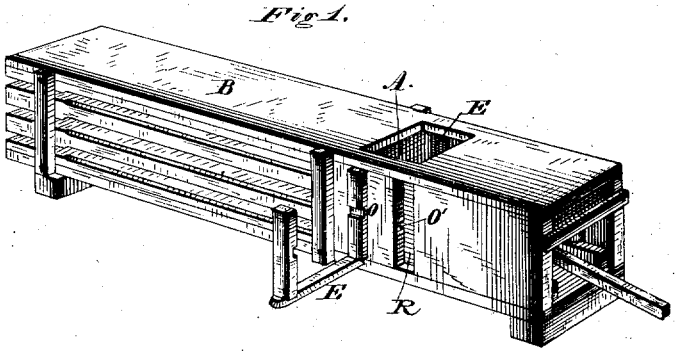
Figure 2:
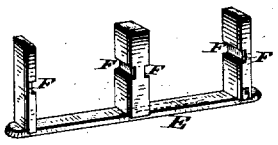
Figure 3:
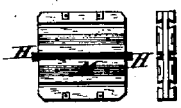
Figure 4:
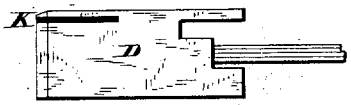
Figure 5:
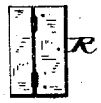

In the drawings, Figure 1 is a perspective view of a continuous-baling press-frame, which may be constructed, except in the particulars named above, as shown, or in any ordinary manner. Fig. 2 represents the frame for carrying the followers. Fig. 3 shows the improvement in the partition-followers which separate the bales. Fig. 4 represents the improvement in the traverser for pressing the hay. Fig. 5 is a view of the hinged leaf for covering the aperture through which the followers are passed.

Similar letters of reference in the several figures denote the same parts.

In the drawings, A represents the press-box; B, the bale-chamber; O O′, apertures in the press-case, the form of which is shown closed by the frame E, by which the partition-followers are introduced. Said frame E is represented detached in Fig. 2. It consists of a frame-work of suitable size and strength to hold the partition-follower. It is represented as made with a bottom piece having uprights fixed thereon, the uprights being made to correspond to the height of the follower. These uprights are provided with notches F F, made in their sides, to correspond with the projections H H on the ends of the partition-follower. These serve to retain the followers in place; but spring-catches may also be used, if deemed desirable.

The frame passes into the side of the box through the opening O, as shown in Fig. 1, and through a similar opening cut in the opposite side. The parts are so adapted to each other that when a partition-follower placed in one side of the frame is brought into line with the traverser, so as to be pushed forward, the other end of the frame outside the box shall be in position to receive another partition-follower, which, in its turn, may be pushed into place, the end first in place moving out on the opposite side. I have provided, just in rear of the said frame, an opening, O′, Fig. 1, through which the follower may be introduced by hand. The opening is covered by a hinged leaf, R, which prevents the hay from being forced into it during the pressing operation.

The improved followers (shown at M in Fig. 3) are made with grooves on both sides, said grooves being made narrow at the top, in order to prevent the hay from being pressed into them. In one pair of grooves I have shown projections formed by sheet-metal strips, bent to fit the grooves, and made long enough to project on each side. These projections may be on all slots, if desired, and corresponding grooves formed on the inside of the press-box to admit their passage. They will thus pass freely through the press-box, and will project into the slots in the bale-chamber, where the ties may be inserted into them without difficulty, even though the ends of the partition-follower should be covered by the hay or other material passed around them.

The improved traverser, Fig. 4, is made with leaves, with a pad, K, of rubber or other suitable yielding material, placed between. The leaves have been heretofore shown; and the improvement consists in the employment of the yielding material, which serves to give additional elasticity to the top and prevent any dirt or seed from accumulating between the leaves.

In the operation of my improved press, the follower is placed securely in its proper position in the frame outside the press-box, and the frame then slipped laterally through the box into place, the partition-follower being then in line with the inner surfaces of the box. The traverser, in its forward motion, then drives the follower out of the frame and into place in the box. The other part of the frame is then in position to receive another follower, and so on in succession.

Instead of employing the frame for introducing the follower, the latter may be inserted by hand through the opening O′ before mentioned. The hay or other material to be pressed is passed into the press-box A, and forced into the chamber B by the traverser D. The top of the traverser yields to allow any hay projecting above it to pass over. This operat on is continued until the bale is formed within the bale-chamber, when another follower is introduced, in either manner described above.

I claim as my invention—

1. The press-case provided with one or more apertures, O, for the purpose set forth.

2. The sliding frame fitted to receive the followers and guide them into the box, as set forth.

3. The follower M, provided with grooved projections, for the purpose set forth.

4. The traverser provided with yielding substance between the leaves, for the purpose specified.

5. The hinged leaf R, in combination with the aperture O′, for the purpose set forth.

PETER K. DEDERICK.

Witnesses:
M. CHURCH,
WILLIAM BLACKSTOCK